(12) United States Patent
Olsson et al.

(10) Patent No.: US 9,164,284 B2
(45) Date of Patent: Oct. 20, 2015

(54) WEARABLE DEVICE WITH INPUT AND OUTPUT STRUCTURES

(71) Applicant: Google Inc., Mountain View, CA (US)

(72) Inventors: Maj Isabelle Olsson, San Francisco, CA (US); Mitchell Joseph Heinrich, San Francisco, CA (US); Daniel Kelly, San Jose, CA (US); John Lapetina, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/037,727

(22) Filed: Sep. 26, 2013

(65) Prior Publication Data

US 2014/0022163 A1    Jan. 23, 2014

Related U.S. Application Data

(63) Continuation of application No. 13/212,686, filed on Aug. 18, 2011.

(51) Int. Cl.
  *G02B 27/01* (2006.01)
(52) U.S. Cl.
  CPC .... *G02B 27/0176* (2013.01); *G02B 2027/0158* (2013.01); *G02B 2027/0178* (2013.01)
(58) Field of Classification Search
  CPC ............ G02B 27/017; G02B 27/0172; G02B 27/0176; G02B 27/0179; G02B 2027/0158; G02B 2027/0178
  USPC ............................................................. 345/8
  See application file for complete search history.

(56) References Cited

U.S. PATENT DOCUMENTS

| 4,867,551 A | 9/1989 | Perera |
| D327,079 S | 6/1992 | Allen |
| 5,175,571 A | 12/1992 | Tanefsky et al. |

(Continued)

FOREIGN PATENT DOCUMENTS

| CN | 1335529 A | 2/2002 |
| CN | 1957284 A | 5/2007 |

(Continued)

OTHER PUBLICATIONS

International Search Report & Written Opinion for Application No. PCT/US2012/050690 dated Feb. 28, 2013.

(Continued)

*Primary Examiner* — Quan-Zhen Wang
*Assistant Examiner* — Xuemei Zheng
(74) *Attorney, Agent, or Firm* — Lerner, David, Littenberg, Krumholz & Mentlik, LLP

(57) ABSTRACT

An electronic device including a frame configured to be worn on the head of a user is disclosed. The frame can include a bridge configured to be supported on the nose of the user and a brow portion coupled to and extending away from the bridge and configured to be positioned over a side of a brow of the user. The frame can further include an arm coupled to the brow portion and extending to a free end. The first arm can be positionable over a temple of the user with the free end disposed near an ear of the user. The device can also include a transparent display affixed to the frame adjacent the brow portion and an input affixed to the frame and configured for receiving from the user an input associated with a function. Information related to the function can be presentable on the display.

22 Claims, 9 Drawing Sheets

(56) References Cited

U.S. PATENT DOCUMENTS

| | | |
|---|---|---|
| D334,557 S | 4/1993 | Hunter et al. |
| D337,320 S | 7/1993 | Hunter et al. |
| D402,651 S | 12/1998 | Depay et al. |
| 6,034,653 A | 3/2000 | Robertson et al. |
| D436,960 S | 1/2001 | Budd et al. |
| 6,356,392 B1 | 3/2002 | Spitzer |
| 6,879,443 B2 * | 4/2005 | Spitzer et al. ............ 359/630 |
| D512,985 S | 12/2005 | Travers et al. |
| 7,158,096 B1 | 1/2007 | Spitzer |
| D559,250 S | 1/2008 | Pombo et al. |
| D565,082 S | 3/2008 | McClure et al. |
| D602,064 S | 10/2009 | Mitsui et al. |
| 7,631,968 B1 | 12/2009 | Dobson et al. |
| 7,648,236 B1 | 1/2010 | Dobson |
| 7,663,805 B2 | 2/2010 | Zaloum et al. |
| 7,675,683 B2 | 3/2010 | Dobson et al. |
| 7,843,403 B2 | 11/2010 | Spitzer |
| 8,000,000 B2 | 8/2011 | Greenberg et al. |
| D646,316 S | 10/2011 | Zhao |
| 2003/0090439 A1 | 5/2003 | Spitzer et al. |
| 2004/0252077 A1 * | 12/2004 | Terasaki ............ 345/8 |
| 2005/0083591 A1 * | 4/2005 | Kobayashi et al. ....... 359/831 |
| 2005/0219152 A1 * | 10/2005 | Budd et al. ............ 345/8 |
| 2007/0008484 A1 | 1/2007 | Jannard |
| 2008/0291277 A1 | 11/2008 | Jacobsen et al. |
| 2009/0201460 A1 | 8/2009 | Blum et al. |
| 2010/0045928 A1 | 2/2010 | Levy |
| 2010/0073262 A1 * | 3/2010 | Matsumoto ............ 345/8 |
| 2010/0079356 A1 | 4/2010 | Hoellwarth |
| 2010/0110368 A1 * | 5/2010 | Chaum ............ 351/158 |
| 2010/0149073 A1 | 6/2010 | Chaum et al. |
| 2010/0157433 A1 | 6/2010 | Mukawa et al. |
| 2010/0188314 A1 | 7/2010 | Miyake et al. |
| 2011/0012814 A1 | 1/2011 | Tanaka |
| 2011/0213664 A1 | 9/2011 | Osterhout et al. |
| 2011/0248905 A1 | 10/2011 | Chosokabe et al. |
| 2012/0268433 A1 * | 10/2012 | Horii et al. ............ 345/204 |

FOREIGN PATENT DOCUMENTS

| | | |
|---|---|---|
| CN | 101467446 A | 6/2009 |
| CN | 101675371 A | 3/2010 |
| CN | 101846802 A | 9/2010 |
| CN | 101930125 A | 12/2010 |
| EP | 0899599 A2 | 3/1999 |
| WO | 2010092904 A1 | 8/2010 |

OTHER PUBLICATIONS

Chinese Office Action for Application No. 201280040152.3 dated May 14, 2015.

* cited by examiner

WEARABLE DEVICE WITH INPUT AND OUTPUT STRUCTURES

CROSS-REFERENCE TO RELATED APPLICATIONS

The present application is a continuation of U.S. patent application Ser. No. 13/212,686, filed on Aug. 18, 2011, the disclosure of which is hereby incorporated herein by reference.

BACKGROUND

Personal video or image displays are devices that are used to display an image received from a source for viewing by a single user. Such devices can be in the form of head-mounted displays that are worn on the head of a user and include one or more image sources over or in front of the user's eyes. Head-mounted displays can include an image source positioned adjacent and associated with each eye of the user or wearer and can be configured to present the same image, viewable as a single two-dimensional image. Alternatively, some such devices can be configured to present different stereoscopic images that are interpreted by the viewer as a single three-dimensional image. Regardless of the type of image presented to the user, such devices are usually blacked-out. That is, they almost entirely obstruct the wearer's vision outside of the screen or other image source included therein so that the user can see nothing but the image presented by the device's display system.

Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms. Accordingly, further advances in wearable devices including displays have been needed.

BRIEF SUMMARY

An embodiment of the present disclosure relates to an electronic device including a frame configured to be worn on the head of a user. The frame includes a bridge configured to be supported on the nose of the user, and a brow portion coupled to and extending away from the bridge to a first end remote therefrom and configured to be positioned over a first side of a brow of the user. The frame further includes a first arm having a first end coupled to the first end of the brow portion and extending to a free end. The first arm is configured to be positioned over a first temple of the user with the free end disposed near a first ear of the user. The device also includes a generally transparent display affixed to the frame and positioned adjacent the brow portion thereof and an input device affixed to the frame and configured for receiving from the user an input associated with a function. Information related to the function is presentable on the display.

The brow portion of the frame can further extend away from the bridge to a second end opposite the first end thereof and can be further configured to be positioned over a second side of the brow of the user. The frame can further including a second arm having a first end coupled to the second end of the brow portion and extending to a free end thereof. The second arm can be configured to be positioned over a second temple of the user with the free end thereof disposed near a second ear of the user.

The frame can include means for securing the display thereto configured such that display is moveable with respect to the frame through rotation about an axis that extends parallel to the first direction. Such means for securing the display can further be configured such that the display is moveable with respect to the frame through translation along the axis. In an example, such means for securing can includes a mounting portion of the frame affixed to the first brow portion near the first arm. The mounting portion can include a post, and the display is can be configured to receive the post to rotatably affix the display to the frame. The housing can also be configured to be movable in a transverse direction along the post.

The generally transparent display can be a prism of a transparent material configured to make an image projected into a side of the prism visible at a surface of the prism that is at a nonzero angle to the side of the prism. The projected image can be viewable by a wearer of the device in conjunction with an external image viewable through the prism. The prism can be mounted to the housing adjacent the first arm. Such a housing can include an image source configured to project the image into the side of the prism. The prism can be mounted to the frame through attachment to the image source, and the image source can be rotatably secured within the housing. The brow portion of the frame can include a receiving portion configured to receive the housing to affix the housing to the frame.

The input of the device can be a touch-sensitive input device that is affixed to the frame such as by mounting on the arm of the frame. The touch-sensitive input can include a touch surface having a texture thereon. Further, the touch-sensitive input can include multiple touch surfaces. Additionally or alternatively, the input device can include a motion sensor configured to detect a motion of the device that corresponds to the input. The device can further include a camera affixed to the frame and facing in a direction opposite the first arm and generally perpendicular to the brow portion.

The device can further include an electronics housing containing control circuitry for the electronic device affixed on a portion of the frame. The electronics housing can be affixed on the free end of the first arm and can include a portion that extends away from the arm and is configured to extend around at least a portion of the ear of the user. Additionally or alternatively, the electronics housing can be configured to enclose a battery to provide power the device.

Another embodiment of the present disclosure relates to an electronic device having a frame configured to be worn on the head of a user. The frame includes a bridge configured to be supported on the nose of the user, a brow portion coupled to and extending away from the bridge to a first end remote therefrom and configured to be positioned over a first side of a brow of the user, and a first arm having a first end coupled to the first end of the brow portion and extending to a free end. The first arm is configured to be positioned over a first temple of the user with the free end disposed near a first ear of the user. The bridge is adjustable for selective positioning of the brow portion relative to an eye of the user. The device further includes a generally transparent display and means for affixing the display to the frame such that display is moveable with respect to the frame through rotation about a first axis that extends parallel to the first brow portion. The display also includes an input device affixed to the frame and configured for receiving from the user an input associated with a function, wherein information related to the function is presentable on the display.

Another embodiment of the present disclosure relates to an electronic device including a frame configured to be worn on the head of a user, the frame including a bridge configured to be supported on the nose of the user, a brow portion coupled to and extending away from the bridge to a first end remote therefrom and configured to be positioned over a first side of a brow of the user, and a first arm having a first end coupled to the first end of the brow portion and extending to a free end. The first is configured to be positioned over a first temple of the user with the free end disposed near a first ear of the user. The device also includes a generally transparent display affixed to the frame and positioned adjacent the brow portion thereof. An input device is affixed to the frame and configured for receiving from the user an input associated with a function, wherein information related to the function is presentable on the display. An electronics housing containing control circuitry for the electronic device is affixed on the free end of the first arm and has a portion that extends away from the arm and is configured to extend around at least a portion of the ear of the user. The display and the input device can exert a first weight force centered over a first side of the ear of the user, and the electronics housing can be positioned and configured to provide a balancing weight against the first weight force that is centered over a second side of the ear.

Another embodiment of the present disclosure relates to an electronic device including a frame configured to be worn on the head of a user. The frame has a bridge configured to be supported on the nose of the user and a brow portion having a body coupled to and extending away from the bridge to a first end remote therefrom. The body of the brow portion includes a flange along at least a portion thereof, and the end includes a first wall substantially perpendicular to the flange, the flange and the first wall together defining a receiving portion. The brow portion is configured to be positioned over a first side of a brow of the user. A first arm having a first end is coupled to the first end of the brow portion and extends to a free end. The first arm is configured to be positioned over a first temple of the user with the free end disposed near a first ear of the user. The device further includes display unit including a display housing and a generally transparent display element. The display unit is affixed within the receiving portion of the brow portion. An input device is affixed to the frame and configured for receiving from the user an input associated with a function, wherein information related to the function is presentable on the display element.

DETAILED DESCRIPTION

Figure 1:
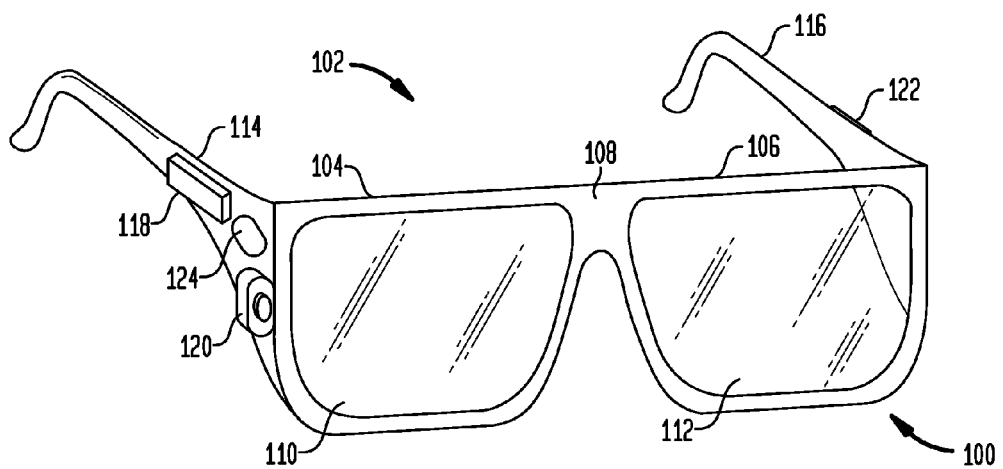
FIG. 1 illustrates an example system for receiving, transmitting, and displaying data.

Embodiments of the present disclosure are described herein with reference to the drawing figures. FIG. 1 illustrates an example system 100 for receiving, transmitting, and displaying data. The system 100 is shown in the form of a wearable computing device. While FIG. 1 illustrates a head-mounted device 102 as an example of a wearable computing device, other types of wearable computing devices could additionally or alternatively be used. As illustrated in FIG. 1, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
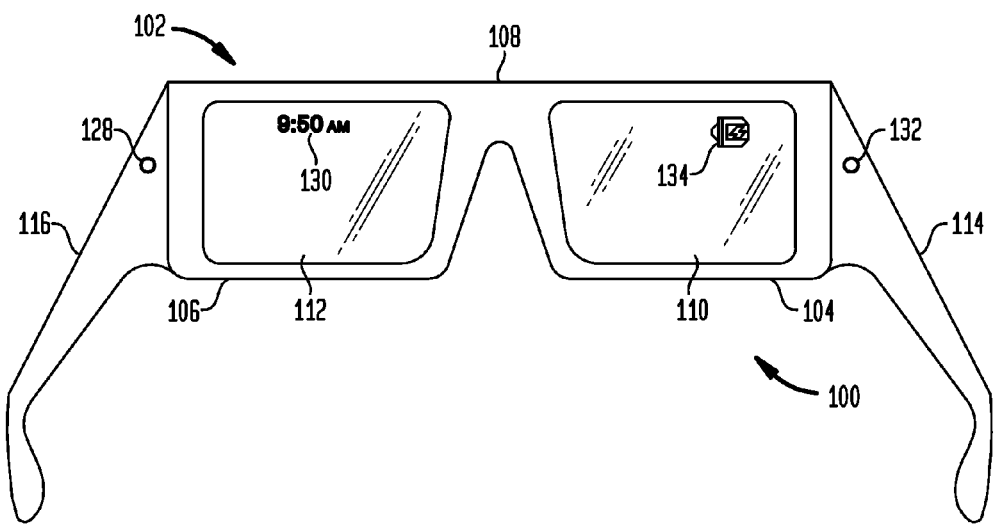
FIG. 2 illustrates an alternate view of the system of FIG. 1.

FIG. 2 illustrates an alternate view of the system 100 illustrated in FIG. 1. As shown in FIG. 2, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 3A:
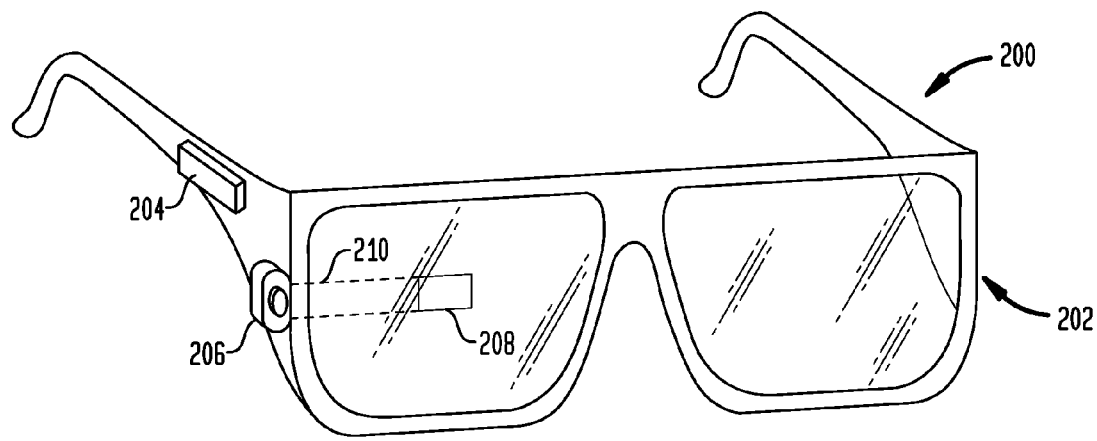
FIG. 3A illustrates an example system for receiving, transmitting, and displaying data.

FIG. 3A illustrates an example system 200 for receiving, transmitting, and displaying data. The system 200 is shown in the form of a wearable computing device 202. The wearable computing device 202 may include frame elements and side-arms such as those described with respect to FIGS. 1 and 2. The wearable computing device 202 may additionally include an on-board computing system 204 and a video camera 206, such as those described with respect to FIGS. 1 and 2. The video camera 206 is shown mounted on a frame of the wearable computing device 202; however, the video camera 206 may be mounted at other positions as well.

As shown in FIG. 3A, the wearable computing device 202 may include a single display 208 which may be coupled to the device. The display 208 may be formed on one of the lens elements of the wearable computing device 202, such as a lens element described with respect to FIGS. 1 and 2, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 3B:
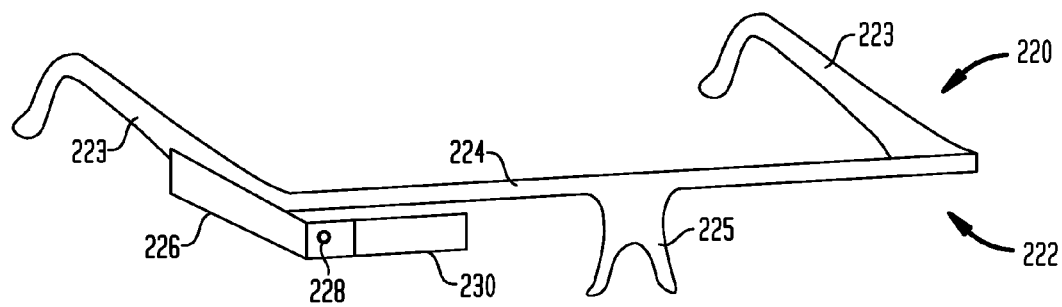
FIG. 3B illustrates an example system for receiving, transmitting, and displaying data.

FIG. 3B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 3B, the center frame support 224 connects the side-arms 223. The wearable computing device 222 does not include lens-frames containing lens elements. The wearable computing device 222 may additionally include an onboard computing system 226 and a video camera 228, such as those described with respect to FIGS. 1 and 2.

The wearable computing device 222 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 3B.

Figure 4:
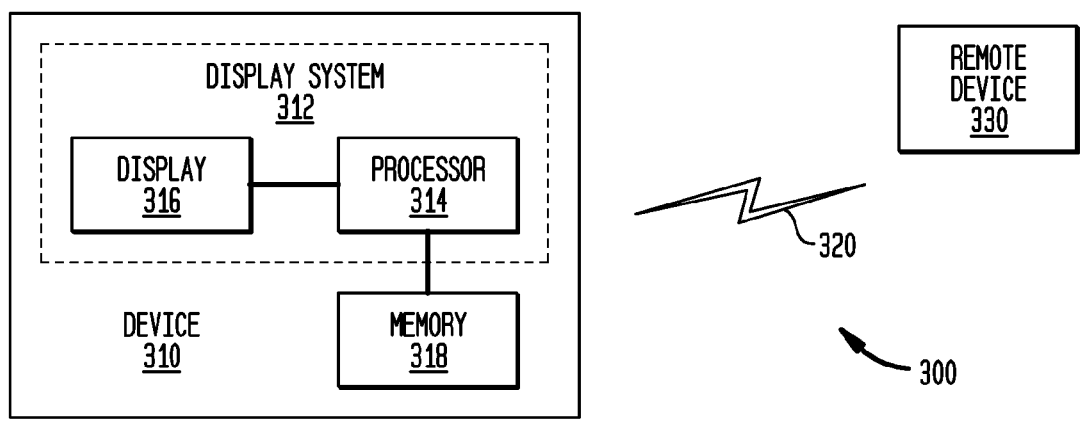
FIG. 4 illustrates an example system for receiving, transmitting, and displaying data.

FIG. 4 illustrates a schematic drawing of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, 10 the device 310 may be a heads-up display system, such as the head-mounted device 102, 200, or 220 described with reference to FIGS. 1-3B.

Thus, the device 310 may include a display system 312 comprising a processor 314 and a display 316. The display 310 may be, for example, an optical see-through display, an optical see-around display, or a video see-through display. The processor 314 may receive data from the remote device 330, and configure the data for display on the display 316. The processor 314 may be any type of processor, such as a microprocessor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 4, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 5:
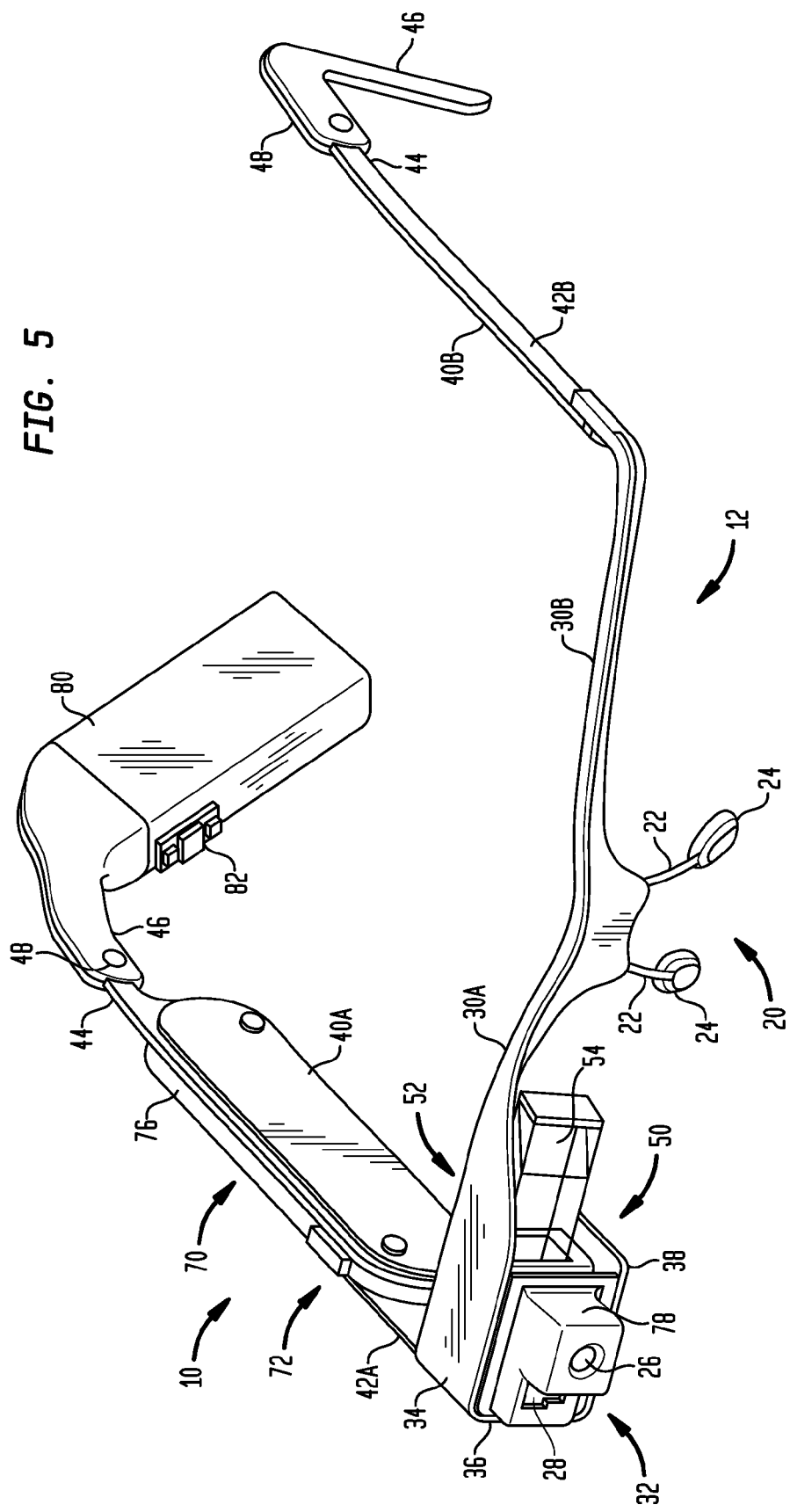
FIG. 5 illustrates a wearable computing device.
Figure 6:
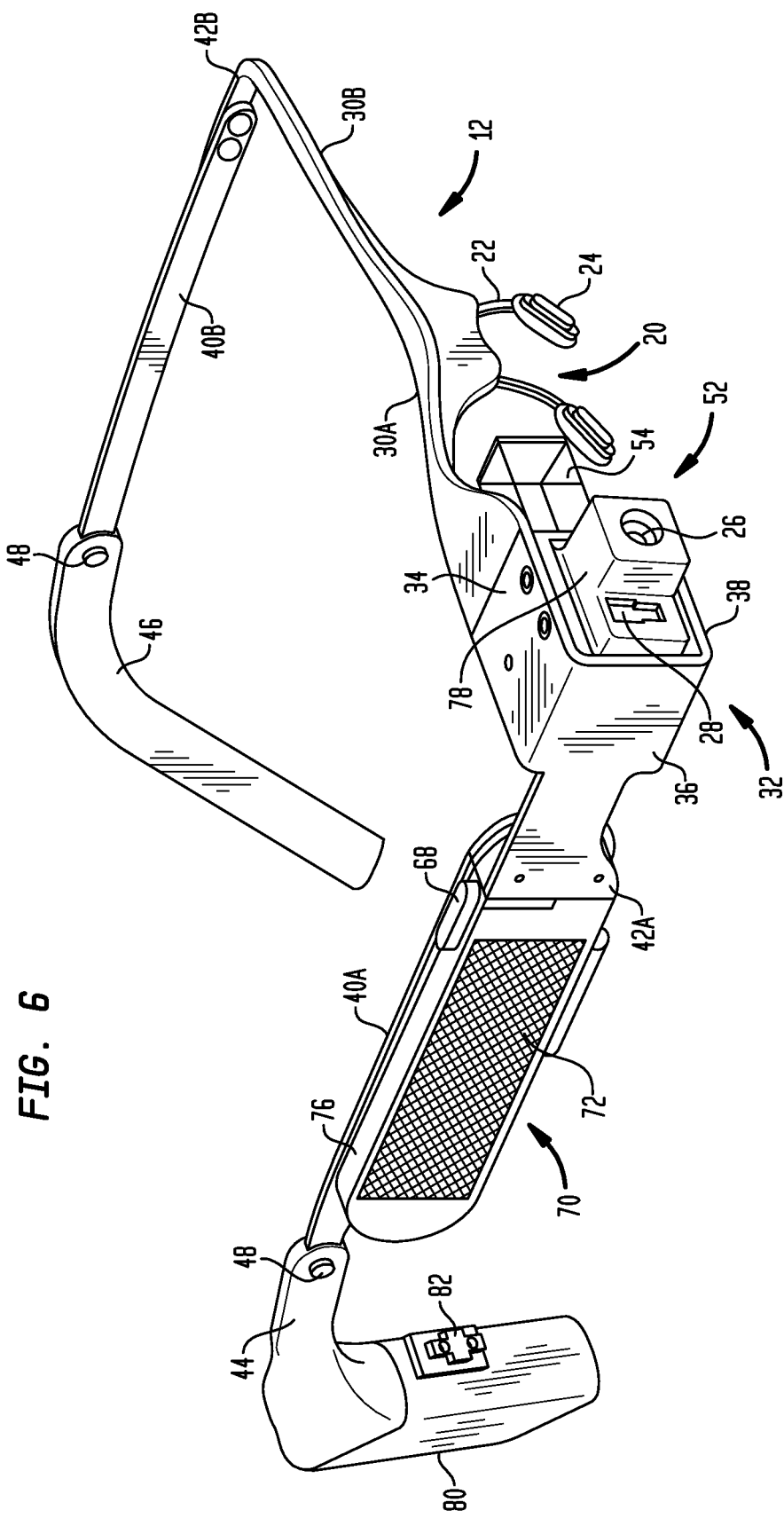
FIG. 6 illustrates an alternate view of the device of FIG. 5.

FIGS. 5-10 illustrate a device 10 that can implement the system 100 discussed above with reference to FIGS. 1-4. FIGS. 5 and 6 show an embodiment of device 10 that is configured to be worn on the head of a user with a display 50 thereof positioned adjacent the user's eye for making an image viewable by the user. The device 10 also includes an input device in the form of a touch-based input 70 that is accessible to the user to allow the user to execute a control function of the device 10 or a function of another device that is connected or in communication with device 10.

Both display 50 and touch-based input 70 are affixed to a frame 12 that includes features that make device 10 wearable on the head of the user. In general, frame 12 can be similar to a frame associated with a pair of glasses, e.g., prescription glasses or sunglasses. Device 10, as shown herein, lacks the lenses typically included in eyeglasses and further does not include a lower portions eyeglass frame member that can be used to help secure the lenses to the frame thereof. However, other embodiments of the device 10 discussed herein could include both lenses and additional parts or features of frame 12 that can help secure the lenses thereto.

Frame 12 includes a bridge portion 20 that is configured to rest on a part of the nose of the user. In the embodiment shown, bridge portion 20 includes a pair of bridge arms 22 that extend in a direction from the bridge 20. In the view of the embodiment of device 10 shown in FIG. 5, bridge arms 22 extend in a downward direction from bridge. The orientation of device 10 shown in FIG. 5 generally corresponds to the orientation of device 10 when being worn by a user when the user's head is in a neutral, upright position. The description of bridge arms 22 extending downward from bridge 20 is made in such a reference frame and is done for purposes of the present description. Discussion of any other relative reference directions is also made for similar purposes and none are intended to be limiting with respect to the present disclosure, unless explicitly stated.

Bridge arms 22 desirably include respective pads 24 thereon, which can be positioned to rest on parts of the nose of the wearer. Pads 24 can be made of a material that is softer than arms for purposes of comfort. Additionally the material that pads 24 are made from can be flexible or have a texture that prevents slippage along the surface of the user's nose. Bridge arms 22 can be flexible to further provide a comfortable fit and or grip on the user's nose. Further, bridge arms 22 can be deformably bendable and repositionable so that the position of pads 24 can be changed to best fit the user. This can include movement closer together or farther apart or fore and aft relative to bridge 20, which can adjust the height of frame 10 and, accordingly, the position of display 50 relative to the user's eye. Further adjustment of display and other structures thereof are described in further detail below. In other embodiments, structures similar to arms and pads can be integrally formed with the remaining structure of bridge 20 and can be structured such that larger or smaller areas of the bridge contact the nose of the user, compared to the embodiment of the bridge shown. Other arrangements are also possible according to structures implemented in existing eyeglass and sunglass designs.

Frame 12 also includes one or more brow portions 30 that extend in a lateral direction away from bridge 20. The embodiment shown includes two brow portions 30A and 30B, each extending away from opposite sides of bridge 20. In other embodiments, only a single brow portion, such as in the position of brow portion 30A, can be included extending laterally away from bridge portion 20. In such an embodiment, the single brow portion is included on the side of the display 50 and substantially nothing is on the other side of bridge portion 20. In still further embodiments, one or two brow portions can be integrally formed with or can be substituted with a specially structured lens. Brow portions 30A,30B are shaped to extend laterally past the user's eye while being positioned above (or alternatively below) the eye so as to not obstruct the wearer's vision. A number of different shapes and structures are possible for brow portions 30A,30B, in addition to what is shown in the figures. The specific shape of brow portions 30A,30B can depend on the shape and structure of bridge portion 20. As a further alternative, a single brow portion have the bridge portion affixed thereto at or near a center thereof and can extend laterally past each eye on opposite sides of the center.

Brow portions 30A,30B can be of the same or a different material from bridge portion 20. Examples of suitable materials for the brow portion 30, or any other part of frame 12, can include various types of plastic such as polycarbonate, acrylic, ABS, and polyethylene. Any parts of frame 12, including the bridge 20 and brow portions 30, can be made from metal such as aluminum, stainless steel, titanium, nickel, gold, or various alloys including one or more of the metals listed or similar metals. Brow portion 30 can be monolithically formed with bridge portion 20 from the same material, or brow portion 30 and bridge portion 20 can be made from different materials and affixed together using adhesives, screws, various forms of welding, soldering, braising, or the like.

Frame 12 also includes one or more temple portions in the form of arms that extend from the brow portions 30, past the user's temple, and toward the user's ear. As shown in FIG. 5, frame 12 can include two arms 40A,40B that can be positioned to extend in a rearward direction from respective brow portions 30A,30B. In an embodiment with a single brow portion on a single side of the bridge portion, only one arm would be present. Arms 40A,40B may provide additional points, or areas, of contact with the user's head and contribute to the device's fit and retention to the user's head. Arms 40A,40B can be similar in structure or function to corresponding features of eyeglasses.

Arms 40A,40B can be affixed to respective brow portions 30A,30B, using rigid connections 42, which can be made using screws assembled between arms 40A,40B and brow portions 30A,30B, as shown. Alternatively, arms 40A,40B can be affixed to respective brow portions 30A,30B using a hinge member arranged to permit arms 40A,40B to be folded inward toward brow portions 30 for easy storage or transportation. If hinges are used, they can be spring-loaded or the like to apply a comfortable pressure against the user's head or to accommodate a range of different head sizes comfortably. Alternatively, arms 40A,40B can be integrally or monolithically formed with brow portions 30A,30B. In some embodiments, arms can be made of a plastic material with internal metal reinforcement to allow bending or to prevent breakage.

Arms 40A,40B include respective free ends 44 opposite the connection 42 between respective arms 40A,40B and brow portions 30A,30B. Free ends 44 can be positioned to be located near the ear of a user when wearing device 10. Ear portions 46 can be affixed to or integrally formed with the free ends 44 of the arms 40A,40B. As shown in FIG. 5 ear portions 46 can include an arched, or curved, form, as shown in the figures, such that they bend behind a portion of the rear of the user's ear. As with eyeglasses, the particular shape of ear portions 46 can vary in many ways including the amount by which they bend, the distance around the ear which they extend and the amount of contact, if any, actually maintained with the outside of the ear. Arms 40 can be structured to appropriately position ear portions 46 relative to brow portions 30 to achieve an appropriate fit for a user or a selection of different users. The shape of arms 40 can, accordingly, depend on the size and shape of brow portions. For example, arms 40 can extend substantially rearward from brow portion substantially perpendicular thereto and can be substantially straight. In other embodiments, arms can be angled inward, outward, upward, or downward relative to the outside ends of brow portions 30 and can further be curved in any direction (or multiple directions) to achieve a desired fit or aesthetic quality.

As shown, ear portions 46 can be separate pieces connected to the ends 44 of arms, for example by attachment via hinge 48 that permits rotation about an axis. This arrangement can allow for additional adjustability of ear portions 46 to optionally increase the amount of contact with the ear, or to allow comfortable contact among different users with different head sizes, ear position, etc. In other embodiments, ear portions 46 can be fixedly attached or monolithically formed with arms 40. In a further embodiment, ear portions 46 can extend substantially in-line with arms 40 or can extend inward therefrom, rather than downward, to a position where they rest over the ear on a topmost area thereof but do not hook around the ear. In such an embodiment ear portions 46 or arms 40 can be configured to exert a pressure against the side of the user's head to at least partially retain frame 12 to the user's head by friction generated through the pressure. Ear portions 46 can be made of a similar material to arms 40 or can be made of a different material, such as a soft-touch material, including various thermoplastic elastomers, with either compliant or high friction characteristics.

As mentioned previously, device 10 can include various input and output structures affixed to frame 12. An output structure can be in the form of a display unit 50 that includes a prism 54 mounted on a housing 52 that can also contain electronic components associated with the display. In the embodiment shown, prism 54 is used to display an image generated by the electronic components of the display. Prism 54 is structured to receive a projected image in a receiving side 58 (shown in FIGS. 7, 9A and 9B) and to make that image visible to a user by looking into a viewing side 60 of prism 54. This can be done by making prism 54 with a specific shape and or material characteristics. A description of such a structure can be found in. In the embodiment of FIG. 5, which is shown in an exploded view in FIG. 7, the receiving side 50 of prism 54 is adjacent to or within housing 52 such that the electronic components inside housing 52 can contain a video projector structured to project the desired video image into receiving side 58 of prism 54. Such projectors can include an image source such as LCD, CRT, and OLED displays and a lens, if needed, for focusing the image on an appropriate area of prism 54. The electronic components associated with display unit 50 can also include control circuitry for causing the projector to generate the desired image based on a video signal received thereby.

The receiving surface 58 can be perpendicular to the viewing surface 60 of prism 54 such that a transparent prism can be used to combine the projected image with the view of the environment surrounding the wearer of the device. This allows the user to observe both the surrounding environment and the image of display unit 50. The prism 54 and the display electronics can be configured to present an opaque or semi-transparent image, or combinations thereof, to achieve various desired image combinations.

Display unit 50 can be affixed to frame 12 so that prism is 54 is positioned beneath brow portion 30A or in a position so that the user can comfortably observe viewing surface 60. A number of different positions for prism 54 are possible to meet these criteria. For example, the prism can be positioned directly in front of the user's eye or can be positioned above or below the center of the user's eye, allowing the image of the display device 50 to be out of the user's direct, or straight ahead, sight line, but still allowing the user to direct his or her eyes up or down within a comfortable range to see the image within the prism 54. The prism 54 can be positioned to the left or the right of the center of the eye to achieve a similar affect. Frame 12 or the attachment between display housing 52 and frame 12 can permit user adjustment of the position of prism relative to the user's eye. For example, the vertical location of prism 56 can be changed by adjusting the bridge arms 22 of bridge portion 20, which will raise and lower brow portion 30 on the user's face, and accordingly, raise or lower prism 54, which is affixed to frame 12.

In the embodiment shown, display housing 52 is attached to frame 12 in a receiving structure 32 of frame 12 that is formed as a part of brow portion 30A. Receiving structure 32, as shown, includes a flared top 34, a downwardly depending side and an inwardly-extending bottom 38. These three sides of receiving structure 32 can be configured to secure housing 52 to frame 12 or to provide protection for housing 52 or to achieve a desired aesthetic appearance. In other embodiments, additional or fewer sides of receiving structure 32 can be included. For example, housing can affix to the top 43 or receiving structure 32 only and the structure 32 can lack any sides or bottom. As shown in the exploded view of FIG. 7, housing 52 is attached to frame 12 at the side 36 of receiving structure 32. A post 62 extends away from the inside of side 32 into an interior of the receiving structure 32. A corresponding hole 64 in housing 52 is configured to receive post 62 securely but so as to allow rotation of housing 52 on post 62, translation on post 62 or a combination thereof. Post 62 can also include a flange 66 or other retention feature such as a tab, a screw or the like to limit translation of housing 52 over post 62 and to prevent accidental removal of housing 52 from frame 12. Post 62 and flange 66 can be modified from the embodiment shown to include features, such as cutouts or the like that allow post 62 and or flange 66 to deform, allowing a snap-fit between hole 64 and flange 66. Further, post can be hollow and can be further open to a hollow interior of side 36 or other hollow interior of brow portion 30 to allow for routing therethrough of wires associated with the display electronics. Receiving structure 32 can be sized to provide clearance for housing 52 to rotate through a predetermined range. Post 62 can also be positioned within receiving structure 32 to allow for the predetermined rotation.

Rotation of housing 52 relative to frame 12 can allow for adjustment in the angle of viewing surface 60 of prism 54 relative to the user's eye. This adjustment can be useful to allow the image within prism 54 to be properly viewed by the user throughout various vertical positions of prism 54 relative to the user's eye due to device 10 fitting differently on different user's faces or due to selective adjustment of the vertical position of prism 54 on the user's face, as discussed above.

Figure 9A:
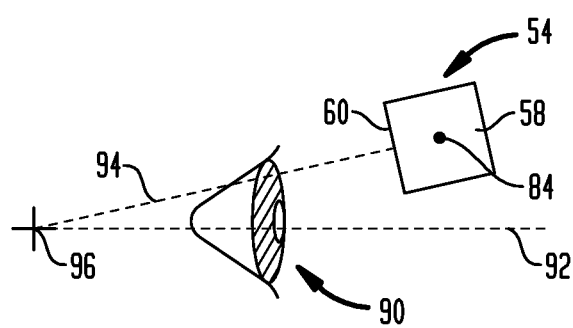
FIGS. 9A and 9B are schematic drawings illustrating aspects of the device of FIG. 5.
Figure 9B:
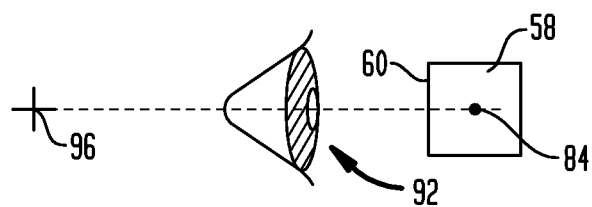

As shown in FIGS. 9A-B, in certain structures of prism 54 it can be beneficial to orient prism 54 such that viewing surface 60 is normal to a line from the image location within prism 54 to the focal center of the user's eye. By allowing rotation of display housing 52 and, thus, prism 54 to rotate relative to frame 12, the prism 54 can be positioned in an optimal angle for viewing by users with different facial structures and different preferences for the horizontal or vertical position of prism 54. FIG. 9A shows prism 54 at a location above the horizontal center 92 of the user's eye 90. Prism 54 is pivoted or otherwise rotated about an axis 84 that extends in a lateral direction relative to the user's face (in and out of the page of FIG. 9A) such that surface 60 is perpendicular to a line 94 extending between surface 60 and the focal center 96 of the user's eye 90. It is noted that the diagram shown in FIG. 9A is only an example and different users can have different locations of their eye's focal center. FIG. 9B shows prism positioned vertically near the horizontal center 92 of the user's eye with prism 54 rotated accordingly for optimal viewing by the user, as described above.

Figure 10:
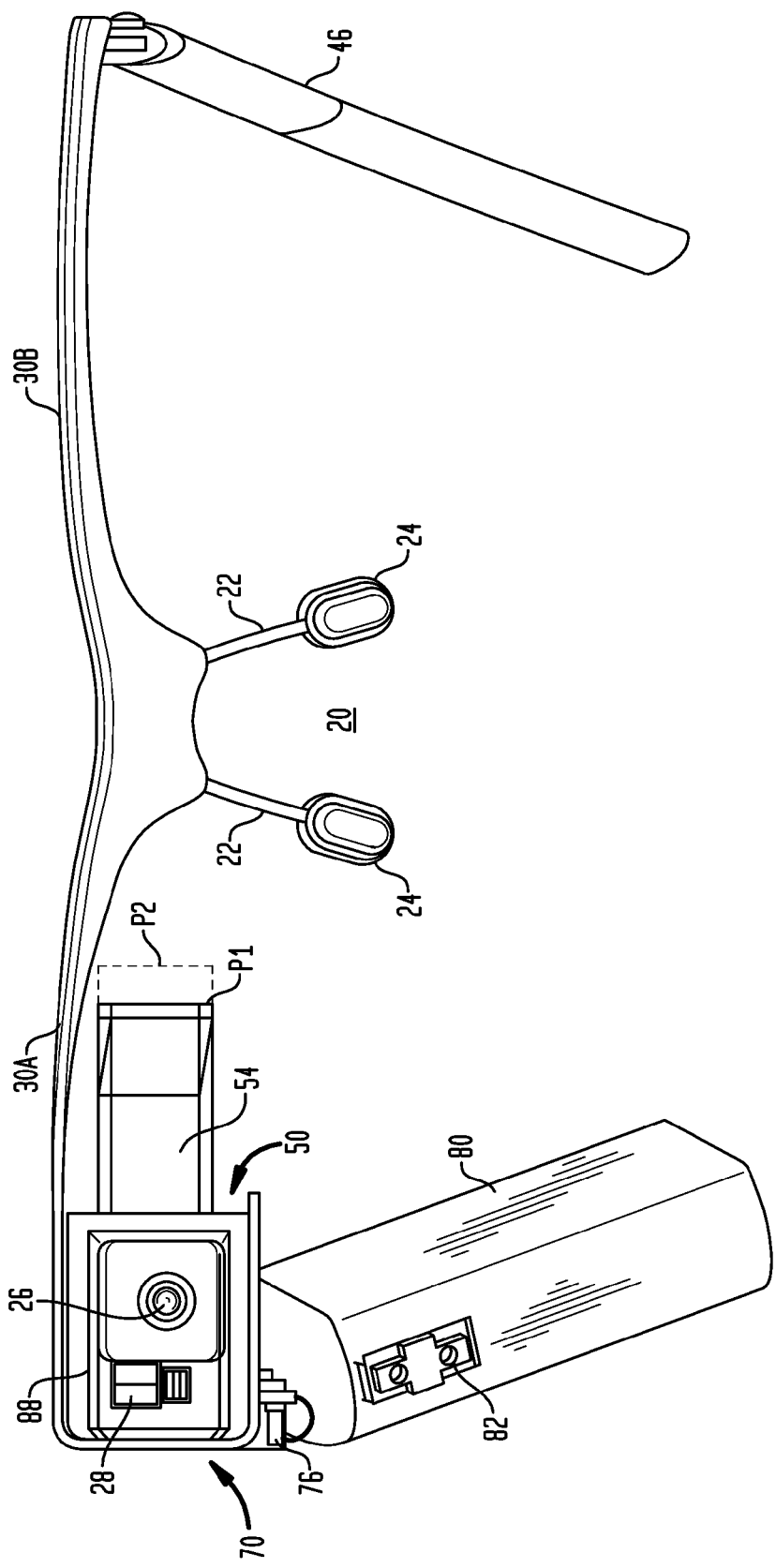
FIG. 10 is a front view of the device of FIG. 5.

Translational adjustment of prism 54 can also be permitted along post 62 and/or along axis 88, as shown in FIG. 10. This translational movement allows for prism 54 to be laterally aligned with the user's eye, the position of which relative to frame 12 can vary among users. Such adjustment can be done according to the user's preference or to achieve an optimal viewing angle in a horizontal plane. In the example of FIG. 10, prism can be slid along post 62 between a first position P1 and a second position P2, in which display 50 is shown in phantom.

In an alternative embodiment, a display can include a prism that is attached to the corresponding electronic circuitry and the image source. The image source and circuitry can then be rotatably mounted within the housing such that the prism is also rotatable with respect to the housing by rotation of the image source and circuitry within the housing. In another alternative embodiment, housing 52 can be secured within receiving portion 32 in a fixed position and structured such that prism 54 is at least approximately positioned according to the discussion of FIGS. 9A-B or FIG. 10 based on an intended or estimated fit of frame 12 on the head of a user.

In the present example, a single display 50 is shown on the side of brow portion 30A. It is noted that display 50 could, instead, be mounted similarly on brow portion 30B. Alternatively, two display units could be included, with one affixed within each brow portion and corresponding to each eye of the user. As a further alternative, a single display could be used with a prism 54 or other structure configured to extend over both eyes of the user for displaying an image viewable by both eyes.

As discussed above, an input device in the form of a touch-based input 70, as shown in FIG. 6, is also desirably included in device 10 and affixed to frame 12. Touch-based input 70 can be a touchpad or trackpad-type device configured to sense at least one of a position and a movement of a finger via capacitive sensing, resistance sensing, or a surface acoustic wave process, among other possibilities. Touch-based input 70 can further be capable of sensing finger movement in a direction parallel or planar to the pad surface, in a direction normal to the pad surface, or both, and may also be capable of sensing a level of pressure applied. Touch-based input 70 can be formed having an outer layer of one or more insulating, or dielectric, layers that can be opaque, translucent, or transparent and an inner layer of one or more conducting layers that can be opaque, transparent, or translucent.

The structure of touch-based input 70 can include a housing 76 that can have an outside and an interior cavity for containing the inner layer of the touch-based input 70 and any electrical structures, such as control circuitry, associated therewith. The outer layer of the touch-based input 70 can be an outer wall of the housing and can include the entire wall or a selected operable area in the form of one or more touch-surfaces 72 thereof, as dictated by the size, shape, and position of the inner layer of the touch-based input 70. If a portion of the housing is to be used as the outer layer of the touch-based input 70, then the housing 76 can be made of a dielectric material such as plastic. In an alternative embodiment, the touch surface 72 is a discrete element that is mounted in an opening in the housing 76.

In the embodiment shown, touch-based input 70 is mounted on arm 40A and defines a vertical plane that overlies a portion of the side of the user's head. Accordingly, touch-based input 70 will not be visible to a user of the device 10, when it is being worn. To help the user identify any touch surfaces 72 of touch-based input 70 the housing 76 can be formed to have a texture provided by a raised, indented, or roughened surface so as to provide tactile feedback to a user when the user's finger contacts the touch surface 72. Such a texture can define the boundaries of the touch surface 72, can be consistent through the touch surface 72, or can vary along horizontal and vertical lengths of the touch surface 72 to give the user feedback as to the location of a finger contacting touch surface 72.

Figure 8:
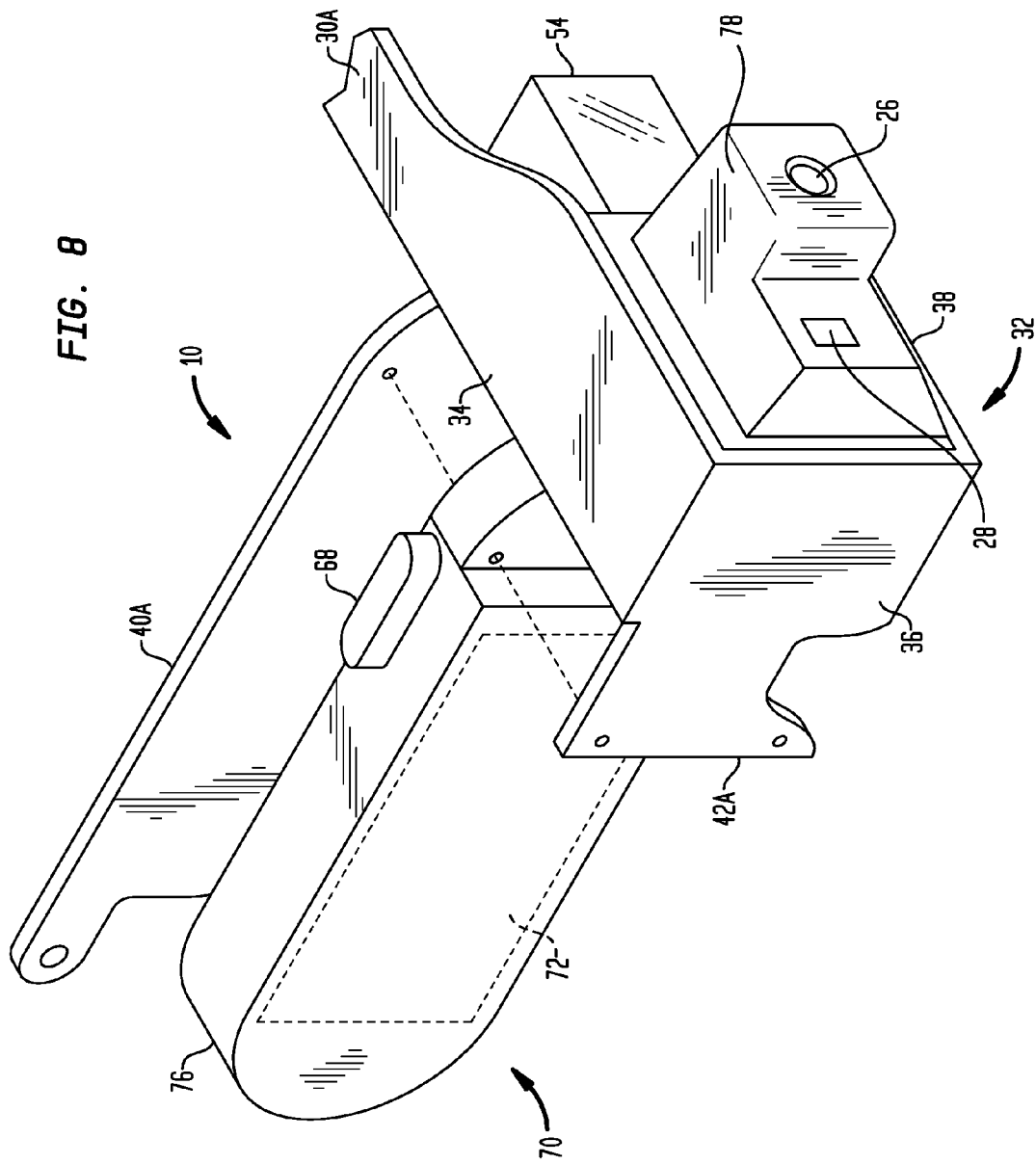
FIG. 8 is an exploded view of the device of FIG. 5 showing various components thereof.

As shown in FIG. 8, in the present embodiment, the housing 76 or touch-based input 70 can be affixed to the frame 12 at a joint portion 42A thereof that extends from the side 36 of receiving portion 32. Joint portion 42A can be integrally formed with brow portion 30A, including with receiving portion 32, and housing 76 can be rigidly affixed thereto, such as by screws or other fasteners. As shown in FIG. 6, the housing for touch-based input 70 can be arranged such that touch surface 72 is flush with a surface of joint portion 42A to provide a uniform appearance. Alternatively, joint portion 42A can include a hinge to allow arm 40A to be folded inward with free end 44 positioned near brow portion 30B, as discussed above. Arm 40A can be affixed to housing 76, as shown on a side opposite touch surface 72. Further, arm 40A can be configured to partially enclose touch-based input 70 by being a part of the housing 76 thereof. In another embodiment, arm 40A can be configured similarly to arm 40B and touch-based input 70 can be mounted thereto.

Touch-based input 70 can also include additional touch surfaces 72 such as the top or bottom surfaces of housing 76. This can be achieved by positioning capacitive sensor layers, for example, beneath the selected housing surfaces. In other embodiments, additional touch-based inputs can be provided in different locations of device 10 such as on brow portion 30A or on display housing 52. Each of the touch-based inputs 70 can be operated independently, and can provide different functions. Additionally, housing 76 can include additional input structures, such as button 68 that can provide additional functionality for device 10, including implementing a lock or sleep feature or allowing a user to toggle the power for device 10 between on and off states.

Touch-based input 70, or another type of input, can be used to provide a control function that is executed by device 10, such as by an on-board CPU, or by a remote device, such as a smartphone or a laptop computer. In an embodiment information related to the control function is viewable by the user on display 50. In one example, the control function is the selection of a menu item. In such an example, a menu with a list of options can be presented on display 50. The user can move a cursor or can scroll through highlighted options by predetermined movement of a finger along touch-based input 70 and can confirm the selection by a different movement, the acceptance of the selection being indicated by the display. Examples of menu item selections can include whether to answer or decline an incoming call on a remotely-linked smartphone or to scroll or zoom-in on a map presented in display.

Figure 7:
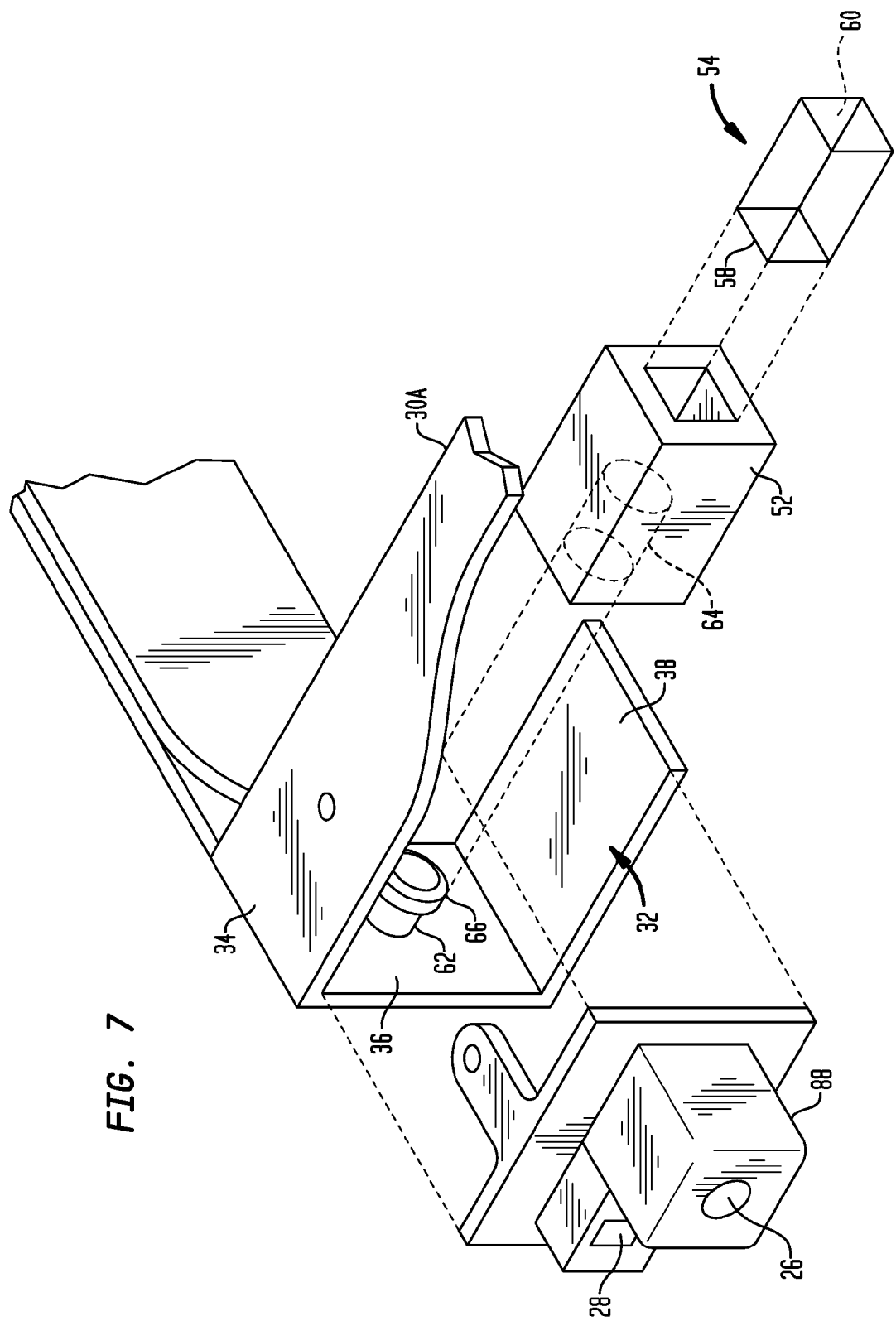
FIG. 7 is an exploded view of the device of FIG. 5 showing various components thereof.

Additional input structures can be included in device 10. These can include a camera 26 and a sensor 28, as shown in FIG. 5. The camera can be used to take picture or record a video at the user's discretion. The camera can also be used by the device to obtain an image of the user's view of his or her environment to use in implementing augmented reality functionality. The sensor 28 can be, for example a light sensor that can be used by firmware or software associated with the camera 26. As shown in FIGS. 5-7, the camera and sensor can be included in a housing 78 positioned within the receiving structure 32 and in front of display housing 52. Other locations for the camera 26 and sensor 28 are also possible.

One or both of the display housing 52 and the touchpad housing 72 can contain electronic circuitry and/or a power source, such as a battery for device 10. This circuitry can include controls for the touchpad 70, the display 50, the camera 26, or the sensor 28. Additionally one or both of the housings can include memory, a microprocessor or communications devices, such as cellular, short-range wireless (e.g. Bluetooth), or WiFi circuitry for connection to a remote device. Additionally, any such circuitry can be included in earpiece housing 80 that is integrally formed with one or more of the ear portions 46 discussed above. As shown in FIGS. 5 and 6, earpiece housing 80 is configured to be positioned behind or over the ear of the user wile being worn. Earpiece housing 80 can be further configured to contact a portion of the user's head to help secure the position of device 10. Earpiece housing 80 can be configured to include a battery or multiple batteries of various forms, such as AAA, AA, or 9-volt style batteries. The battery can also be a rechargeable battery such as a lithium-ion or nickel-cadmium battery and can be removable by the user or can be permanent or semi-permanent. Earpiece housing can also include a port 82 that can be used to connect device 10 to a power source to recharge a battery without removal thereof or to connect device 10 to a remote device for communication therewith, such as described above, or to update or install software or firmware included in the memory of device 10.

Earpiece housing 80 can be configured and positioned to provide a balancing weight to that of touch-based input 70 or display housing 50. Both touch-based input 70 and display housing 50 are positioned forward of the user's ear, which causes a portion of their weight to be carried by the user's nose. By adding weight behind the user's ear (or shifting weight to behind the user's ear) in the form of earpiece housing 80, the ear becomes a fulcrum about which the weight of the display 50 and touch-based input 70 are balanced against that of the earpiece housing 80. This can relieve some of the weight on the user's nose, giving a more comfortable fit. The components within earpiece housing 80, such as a battery or various control circuitry for device 10 can be arranged to contribute to a desired weight distribution for device 10. For example, heavier components, such as a battery, can be placed toward or away from arm 42A to adjust the weight distribution. In an embodiment, a majority of the weight is carried by the ear of the user, but some weight can still be carried by the nose in order to give the device a secure feel and to keep the bridge 20 anchored on the nose to maintain a desired position for prism 54. In an embodiment, between 55% and 90% of the weight of device 10 is carried by the user's ear. Additionally, in an embodiment where earpiece housing 80 is rotatably affixed to arm 42A, the rotation of earpiece housing 80 can allow for customizable weight distribution.

Additional components can be included in device, such as additional inputs, control circuitry boards, antennae or the like. The various locations in which these additional components are affixed to frame 12 can also be selected to allow for a predetermined weight distribution.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An electronic device, comprising:
   a frame configured to be worn on the head of a user, the frame including a bridge configured to be supported on the nose of the user, a brow portion coupled to and extending away from the bridge to a first end remote therefrom and configured to be positioned over a first side of a brow of the user, and a first arm having a first end coupled to the first end of the brow portion and extending to a free end, the first arm being configured to be positioned over a first temple of the user with the free end disposed near a first ear of the user, wherein the bridge is adjustable for selective positioning of the brow portion relative to an eye of the user;
   a display housing including a generally transparent display, the display extending parallel to the brow portion, the display having a surface facing the eye of the user, the display housing being configured to adjust its position relative to the eye of the user, the adjustment of the display housing causing the surface of the display to move relative to a focal center of the eye so that the surface of the display remains perpendicular to the focal center of the eye of the user;
   an input device affixed to the frame and configured for receiving from the user an input associated with a function, wherein information related to the function is presentable on the display, and
   an outer housing positioned at the free end of the first arm, the outer housing containing electronic components for the electronic device, and the outer housing configured to add weight to a rearward portion of the frame positioned behind the first ear of a user so as to counterbalance a weight of the display housing.

2. The electronic device of claim 1, wherein the bridge includes a pair of projections configured for contacting opposing sides of the nose of the user, and wherein the bridge is adjustable by movement of the projections toward each other and away from each other.

3. The electronic device of claim 1, wherein the selective positioning of the brow portion also positions the display over the eye of the user in a first direction toward and away from the brow of the user.

4. The electronic device of claim 3, wherein the display includes a planar viewing surface, and wherein the adjustment of the display housing includes a rotation of the display about a first axis such that the viewing surface is positionable normal to a line from the viewing surface to the focal center of the eye of the user within a range of adjustment of the display in the first direction.

5. The electronic device of claim 1, wherein the display is moveable with respect to the frame through translation along the first axis.

6. The electronic device of claim 5, wherein the axis includes a retention component to prevent removal of the display housing from the frame.

7. The electronic device of claim 1, wherein the frame includes a mounting portion affixed to the first brow portion near the first arm, the mounting portion including a post defining the first axis, and wherein the display is configured to receive the post to rotatably affix the display to the frame.

8. The electronic device of claim 7, wherein the generally transparent display is configured to be movable in a transverse direction along the post.

9. The electronic device of claim 1, wherein the generally transparent display is a prism of a transparent material configured to make an image projected into a side of the prism visible at a surface of the prism that is at a nonzero angle to the side of the prism.

10. The electronic device of claim 9, wherein the projected image is viewable by a wearer of the device in conjunction with an external image viewable through the prism.

11. The electronic device of claim 1, wherein the control circuitry is further configured to add weight to the rearward portion of the frame.

12. An electronic device, comprising:
a frame configured to be worn on the head of a user, the frame including a bridge configured to be supported on the nose of the user, a brow portion coupled to and extending away from the bridge to a first end remote therefrom and configured to be positioned over a first side of a brow of the user, and a first arm having a first end coupled to the first end of the brow portion and extending to a free end, the first arm being configured to be positioned over a first temple of the user with the free end disposed near a first ear of the user;
a display unit having a generally transparent display, the display unit being affixed to the frame and positioned adjacent the brow portion thereof;
an input device affixed to the frame and configured to receive from the user an input associated with a function, wherein information related to the function is presentable on the display; and
an electronics housing containing control circuitry for the display unit and the input device, the electronics housing being affixed on the free end of the first arm and having a portion that extends away from the arm and is configured to extend around at least a portion of the first ear of the user;
wherein the display unit and the input device exert a first weight force centered over a first side of the first ear of the user, and wherein the electronics housing containing the control circuitry is positioned and configured to add weight behind the first ear of the user and provide a predetermined balancing weight force against the first weight force that is centered over a second side of the ear.

13. The electronic device of claim 12, wherein the electronics housing is further configured such that the first weight force and the balancing weight force contribute to an overall weight of the device that is distributed among the nose of the user and the first ear of the user such that a majority of the overall weight is applied to the first ear.

14. The electronic device of claim 12, wherein the electronics housing is further configured to contact a portion of a side of the head of the user on the second side of the first ear.

15. The electronic device of claim 12, further including a camera affixed to the frame adjacent to the display and facing a direction opposite the first arm and generally perpendicular to the brow portion.

16. The electronic device of claim 15, wherein the camera contributes to the first weight force centered over the first side of the ear of the user.

17. The electronic device of claim 16, further including at least one additional component having a respective weight and affixed to one of the electronics housing and the frame such that an overall weight of the device is distributed among the nose of the user and the first ear of the user such that a majority of the overall weight is applied to the first ear.

18. The electronic device of claim 12, wherein the electronics housing is further configured to enclose a battery to provide power the device, the housing affixed on a portion of the frame.

19. The electronic device of claim 12, wherein the brow portion of the frame further extends away from the bridge to a second end opposite the first end thereof and is further configured to be positioned over a second side of the brow of the user, the frame further including a second arm having a first end coupled to the second end of the brow portion and extending to a free end thereof, the second arm being configured to be positioned over a second temple of the user with the free end thereof disposed near a second ear of the user.

20. An electronic device, comprising:
a frame configured to be worn on the head of a user, the frame including a bridge configured to be supported on the nose of the user, a brow portion coupled to and extending away from the bridge to a first end remote therefrom and configured to be positioned over a first side of a brow of the user, and a first arm having a first end coupled to the first end of the brow portion and extending to a free end, the first arm being configured to be positioned over a first temple of the user with the free end disposed near a first ear of the user;
a generally transparent display affixed to the frame and positioned adjacent the brow portion thereof;
an input device affixed to the frame and configured to receive from the user an input associated with a control function during operation of the electronic device, the control function presenting the user with a selection of menu items on the display; and
an electronics housing containing control circuitry for the electronic device rotatably affixed on the free end of the first arm and having a portion that extends away from the arm and is configured to extend around at least a portion of the first ear of the user, wherein the electronics housing is configured to add weight to a rearward portion of the frame positioned behind the first ear of the user so as to counterbalance a weight of the display.

21. The electronic device of claim 20, wherein the electronics housing is further configured to enclose a battery to provide power the device, the housing affixed on a portion of the frame.

22. The electronic device of claim 20, wherein the brow portion of the frame further extends away from the bridge to a second end opposite the first end thereof and is further configured to be positioned over a second side of the brow of the user, the frame further including a second arm having a first end coupled to the second end of the brow portion and extending to a free end thereof, the second arm being configured to be positioned over a second temple of the user with the free end thereof disposed near a second ear of the user.

* * * * *